Patented Feb. 25, 1947

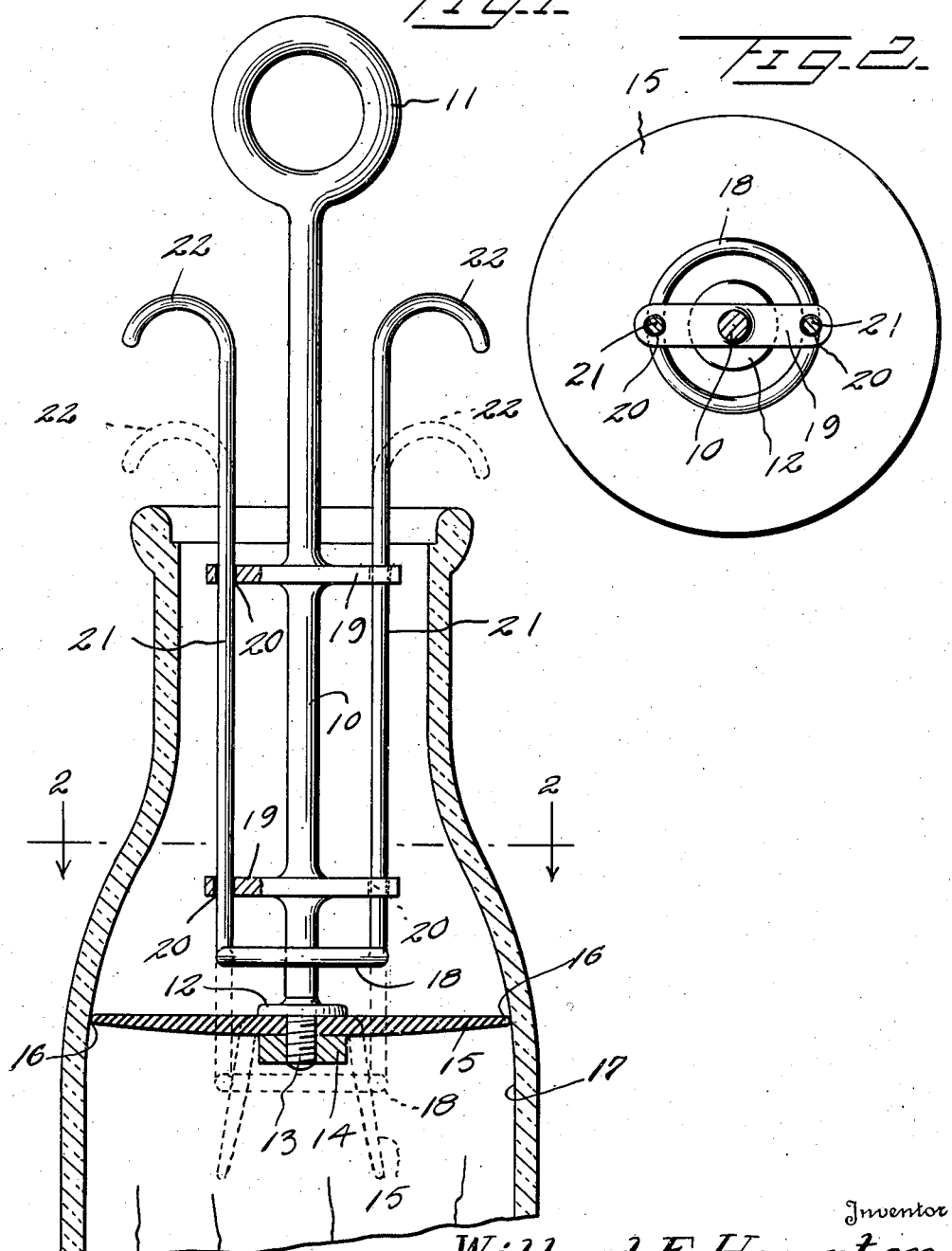

2,416,623

UNITED STATES PATENT OFFICE 2,416,623

CREAM SEPARATOR

Willard F. Hampton, Hutchinson, Kans.

Application October 2, 1944, Serial No. 556,845

4 Claims. (Cl. 210—51.5)

This invention relates to separator devices for fluids or liquids of different specific gravity and pertains particularly to an improved cream separator.

The primary object of the present invention is to provide a device by means of which cream may be separated from the milk while in the milk bottle, in such a way that the cream can be easily and quickly poured off without allowing any of the underlying milk to escape, thereby making it possible to completely remove all of the cream which rises to the top in a milk bottle, without allowing any of the underlying milk to mix therewith.

Another object of the invention is to provide a cream separating device which may be easily and quickly introduced into a milk bottle through the layer of cream and caused to open out in the bottle and form a partition between the bottom of the cream layer and the underlying milk, without materially disturbing the cream or causing any of the cream to become mixed to an appreciable extent, with the milk.

A further and more specific object of the invention is to provide a cream separator by means of which cream may be separated from milk while in the milk bottle, which comprises a flexible diaphragm of rubber or other suitable, similar material, with means, to which the diaphragm is connected, whereby the diaphragm may be bent or drawn into a substantially cylindrical form to be readily introduced into and extended through the cream layer without materially disturbing the same, and then allowed to resume its normal disk-like form within the bottle, substantially in the plane between the meeting surfaces of the cream layer and the milk, to completely partition the bottle so that the cream layer may be poured off without allowing any of the milk to escape.

The invention will be best understood from a consideration of the following detailed description, taken in connection with the accompanying drawing forming a part of this specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view partly in side elevation and partly in section of the device embodying the present invention showing the same in working position within the upper portion of a milk bottle, the bottle being in vertical section.

Figure 2 is a sectional view taken on the line 2—2 of Figure 1.

Referring now more particularly to the drawing, the numeral 10 generally designates the stem forming the main body portion of the device. This stem is of substantial length so that when the inner end thereof is introduced into a milk bottle through the cream layer to an extent where the inner end of the stem will be below the layer of cream, the other end of the stem will project a substantial distance outside the bottle. The said other end carries a ring 11 by means of which the device may be conveiently inserted and withdrawn while the first mentioned or inner end of the stem carries the small disk head 12 and beyond such head is screw-threaded as indicated at 13, to receive the diaphragm or rubber disk securing nut 14.

The threaded portion 13 of the stem 10 is extended through the center of a disk or diaphragm 15 which is formed of rubber or other suitable resilient material. This disk is of a diameter slightly greater than the inside diameter of the milk bottle in which the device is used so that when the device is inserted into the bottle, the diaphragm, when allowed to expand to its full diameter, will have the relatively thin edge thereof pressed firmly against the inner wall surface of the bottle as indicated at 16, to form a seal with the bottle wall 17 and tightly partition off the milk from the cream layer. The bottle may then be tipped and the cream layer entirely poured off without letting any of the milk escape with the cream.

In order to facilitate the introduction of the diaphragm or disk 15 into a milk bottle through the cream layer, without materially disturbing such layer or causing any material mixing of the cream with the milk, means is provided for constricting or reducing the rubber disk to substantially cylindrical form so that it may be smoothly extended through the cream layer to the bottom thereof. Such means comprises the provision of a ring member 18 which encircles the stem 10 upon the inner side of the head 12.

Secured to the stem 10 are the oppositely directed outwardly extending pairs of arms 19, the arms lying in a common plane extending lengthwise of the stem and having guide apertures 20 through which are slidably extended the rods 21, each of which is secured at its inner end to the ring 18.

Each rod 21 extends through two aligned apertures 20 of two spaced arms 19 as shown and each rod at its outer end is turned outwardly to form the finger hook 22.

In the use of the present device the ring 18 is moved inwardly by means of the rods 21, against the rubber disk 15 and the disk is then caused to be constricted to substantially cylindrical form by forcing it against the ring so that the head 12 and the portion of the disk adjacent thereto will be moved through the ring causing the periphery of the disk to be drawn in substantially to the condition in which it is shown in dotted outline in Figure 1.

The constricted disk may then be introduced into the mouth of the bottle and through the cream layer until it reaches the bottom of such layer whereupon, by withdrawing the ring 18 or by moving the head 12 back through the ring, the disk or diaphragm will be permitted to resume or tend to resume its normal circular form. In so doing the periphery of the disk will come into tight contact with the wall of the bottle, the disk being initially of sufficiently greater diameter than the inside diameter of the bottle to permit this. The disk or diaphragm will then form a tight partition in the bottle between the milk and the cream layer as shown in Figure 1, whereupon the bottle may be tipped sufficiently to pour off the cream without permitting any of the milk to escape with the cream.

From the foregoing, it will be readily apparent that there is provided in the present invention, a simple but efficient device for separating cream from milk while in the milk bottle, which device is so designed that it may be easily kept clean and sanitary.

I claim:

1. A device for separating strata of fluids of different specific gravity in a bottle, comprising a circular normally substantially flat, resilient diaphragm having a diameter at least equal to the interior diameter of the bottle, a long carrier member attached to the center of the diaphragm, and means disposed around the carrier and movable axially thereof for reducing the diameter of the diaphragm when moved in one direction to facilitate introducing the diaphragm into the bottle and for releasing the diaphragm when given reverse movement to permit the diaphragm to return to its substantially flat condition.

2. A device for separating selected strata of fluids of different specific gravity in a bottle, comprising a resilient rubber disk having an over-all diameter at least as great as the inside diameter of the bottle, a stem connected to the center of said disk for facilitating introducing the disk into the bottle, and shiftable means carried by the stem on one side of the disc and adapted when moved toward and against the disc to effect the reduction of the diameter of the disk to allow for the introduction of the disk through the bottle mouth to the line of division between the selected strata and when moved back to its initial position, to allow the disc to return by reason of its resilient character to its normal flat condition.

3. A separating device as set forth in claim 2, in which the said means comprises an annulus encircling the stem, and means slidably coupled with the stem and carrying the annulus for effecting desired movement of the annulus relative to the disk.

4. A separating device of the character stated, comprising a relatively long stem having a handle at one end, a portion of the stem at its other end being screw threaded, a head encircling the stem at the inner end of the screw threaded portion, a normally flat, resilient, rubber disk having the threaded portion of the stem extending centrally therethrough, a nut threaded upon the stem to bind the disk against said head, guides carried by the stem, an annulus encircling the stem adjacent the head and having an inside diameter greater than the head, and a rod carried by said guides and connected with said annulus for facilitating the movement of the annulus relative to the disk, the annulus when forced against the disk past said head, sliding over and reducing the diameter of the disk and when retracted permitting the disk to return by reason of its resilient character to its normal flat condition.

WILLARD F. HAMPTON.

REFERENCES CITED

The following references are of record in the file of this patent:

UNITED STATES PATENTS

| Number | Name | Date |
|---|---|---|
| 1,432,816 | Wendt | Oct. 24, 1922 |
| 1,578,389 | Branington | Mar. 30, 1926 |
| 1,590,807 | Burnes | June 29, 1926 |
| 1,613,083 | Casey | Jan. 4, 1927 |
| 2,088,515 | Greene | July 27, 1937 |
| 2,267,654 | Hedenskoog | Dec. 23, 1941 |